Patented Jan. 21, 1947

2,414,650

UNITED STATES PATENT OFFICE 2,414,650

BISMUTH COMPOUNDS

Rudolph A. Kuever and Larry M. Wheeler, Iowa City, Iowa, assignors to the State of Iowa for the use and benefit of the State University of Iowa, Iowa City, Iowa, an educational institution No Drawing. Application May 21, 1943,
Serial No. 487,964

9 Claims. (Cl. 260—447)

The invention relates to new chemical compounds of bismuth. It is an object of the invention to provide such new compounds as reaction products between alcohols and sodium bismuthate.

It is a particular object of the invention to provide water soluble bismuth compounds as reaction products between certain classes of alcohols and sodium bismuthate, which have therapeutic value.

The therapeutic value of bismuth, both by oral administration and parenteral injection has been established in the treatment of several diseases, such as syphilis, Vincent's angina and amaebic dysentery and the value of bismuth in suitable combination as an effective spirochiticide is well proven.

While the use of bismuth compounds in the treatment of disease is known, the compounds now in use are successful only to a limited extent due to certain inherent objections thereto. Among these disadvantages of the known compounds are their sparing solubility in usable solvents whereby the formation of a therapeutically significant solution is extremely difficult, or when soluble the pH of the known compounds is either strongly acidic or highly alkaline in reaction to cause painful by-effects by irritation of the tissues after injection or following oral administration and due to the bismuth being in the trivalent state in the electropositive combination it is relatively inefficient because of insolubility in, or incompatibility with, many of the body fluids.

As an example, one of the most potent of the known compounds is bismuth and potassium tartrate, the only water soluble salt of bismuth recognized by the United States Pharmacopoeia. This compound in curative quantities as an aqueous solution for parenteral injection causes intense pain and when administered orally is entirely changed by the acids of the gastric juices and becomes completely inactive.

We have discovered new bismuth compounds which may be administered orally or parenterally without irritation or pain, are soluble in usable solvents, in aqueous solutions are essentially neutral with a pH of about 7 and unaffected by mild alkalinity or acidity, by blood serum, saliva or urine.

To this end, the invention consists particularly in reacting any polyhydric alcohol with sodium bismuthate.

As illustrative examples (not as limitation) of the alcohols that may be used to provide water soluble compounds with sodium bismuthate are the straight chain polyhydric alcohols:

Ethylene glycol
Proplyene glycol
Glycerin
Erythritol
Arabitol
Sorbitol
Dulcitol
Mannitol and among the cyclic polyhydric alcohols are:

Cyclohexandiol
Cyclohexantriol
Cyclohexanpentol
(Quercitol)
Cyclohexanhexol
(Inositol)

The following process is given as an illustrative example. Equimolecular proportions of sodium bismuthate and erythritol or mannitol or inositol are mixed together in a suitable vessel, with enough water to effect solution if necessary, adding the sodium bismuthate slowly and with constant stirring. When ethylene glycol, propylene glycol, or glycerin is used, the water as a solvent is unnecessary and is omitted. The resulting temperature of reaction must be carefully controlled by ice or cold water to 55–80° C. as decomposition ensues at temperatures above 80° C. The reaction begins at about 55° C. and may be carried on up to about 80° C. Beyond this point decomposition ensues and charring takes place. When the reaction is complete the mixture is allowed to cool to room temperature and a light tan transparent fluid results. This is extremely alkaline and an aqueous solution thereof, 1 in 10, has a pH of about 12. In order to prevent decomposition, neutralization of the resulting free NaOH must be effected immediately and for this purpose the organic acids are used.

Acids which will serve this purpose have been selected from the group of soluble organic acids such as acetic, tartaric, citric, malic and lactic acids. The strong mineral acids such as hydrochloric, nitric, and sulfuric acids, do not serve well, as a slight excess of these acids is destructive to the bismuth compound.

When neutralization has been effected by an organic acid and a pH of approximately 7 is reached, the product is poured into about 5 times its own volume of ethyl alcohol. This precipitates the bismuth compound, leaving a solution of the corresponding sodium salt, such as the acetate, tartrate, etc., of the acid employed for neutralization. The precipitate is flocculent and dense and it is therefore necessary to redissolve it in about three times its own weight of water and again precipitate it in ethyl alcohol as above. It is desirable to again dissolve the second precipitate thus formed in water and form a third precipitate by treatment with ethyl alcohol.

The compound thus purified, may then be dried in a suitable oven at 100° C. and then reduced to a fine powder or it may be scaled by the well known method using highly concentrated aqueous solutions.

In powder form the compounds of the invention are pale yellow or brown heavy powders and when scaled consist of thin, transparent amber or brown scales. They are relatively permanent in air and have characteristic odors and mild metallic tastes.

As examples, compounds of the invention may have the following composition:

*Dihydroxypropyl bismuthate*

| | Per cent |
|---|---|
| Bismuth | 62.8 |
| Carbon | 10.8 |
| Oxygen | 24.1 |
| Hydrogen | 2.1 |

*Trihydroxybutyl bismuthate*

| | Per cent |
|---|---|
| Bismuth | 57.7 |
| Carbon | 13.2 |
| Oxygen | 26.5 |
| Hydrogen | 2.4 |

*Pentahydroxyhexyl bismuthate*

| | Per cent |
|---|---|
| Bismuth | 49.5 |
| Carbon | 17.1 |
| Oxygen | 30.3 |
| Hydrogen | 3.0 |

*Pentahydroxycyclohexyl bismuthate*

| | Per cent |
|---|---|
| Bismuth | 49.7 |
| Carbon | 17.1 |
| Oxygen | 30.3 |
| Hydrogen | 2.6 |

These therefore correspond to the following formulae:

Dihydroxypropyl bismuthate, $C_3H_5(OH)_2BiO_3$
Trihydroxybutyl bismuthate, $C_4H_6(OH)_3BiO_3$
Pentahydroxyhexyl bismuthate, $C_6H_8(OH)_5BiO_3$
Pentahydroxycyclohexyl bismuthate $$C_6H_6(OH)_5BiO_3$$

These compounds are very soluble in water and glycerin but insoluble in alcohol, acetone or ether.

Administered to white rats and rabbits a wide margin of safety as to toxicity has been demonstrated. Administered orally to rats a sufficient quantity of these compounds equal to 1000 mg. of bismuth per kilogram of body weight gave no signs of toxicity or discomfort over a period of several weeks of observed treatment.

Systemic absorption of bismuth was proved by its presence in the urine, blood, etc. Preliminary clinical experiments indicate that these compounds will provide desirable quantities of bismuth for the blood, for the spinal fluid, for the brain and other fluid and solid tissues of the body. A thorough clinical study is now under way.

We claim:
1. A polyhydroxy-n-alkyl mono-bismuthate.
2. Pentahydroxy-n-hexyl mono-bismuthate.
3. A dihydroxy-propyl-bismuthate.
4. Trihydroxy-butyl-bismuthate.
5. The process of preparing a reaction product of sodium bismuthate and a polyhydric normal primary alcohol which comprises heating a polyhydric alcohol with sodium bismuthate at a reaction temperature below about 80° C., neutralizing the alkali formed in the reaction by a water soluble organic carboxylic acid before any substantial decomposition of product by the alkali, and separating said reaction product from the resulting sodium salt of the organic carboxylic acid.
6. The process of preparing a reaction product of sodium bismuthate and glycerine which comprises heating glycerine with sodium bismuthate at a reaction temperature below about 80° C., neutralizing the alkali formed in the reaction by a water soluble organic carboxylic acid before any substantial decomposition of product by the alkali, and separating said reaction product from the resulting sodium salt of the organic carboxylic acid.
7. In a process of preparing a reaction product of sodium bismuthate and glycerine, the steps which comprise heating glycerine with sodium bismuthate at a reaction temperature below about 80° C. and neutralizing the alkali formed in the reaction by a water soluble organic carboxylic acid before any substantial decomposition of product by the alkali occurs.
8. The process of preparing a reaction product of sodium bismuthate and glycerine which comprises heating glycerine with sodium bismuthate at a reaction temperature below about 80° C., neutralizing the alkali formed in the reaction by citric acid before any substantial decomposition of product by the alkali, and separating said reaction product from the resulting sodium salt of citric acid.
9. In a process of preparing a reaction product of sodium bismuthate and glycerine, the steps which comprise heating glycerine with sodium bismuthate at a reaction temperature below about 80° C. and neutralizing the alkali formed in the reaction by citric acid before any substantial decomposition of product by the alkali occurs.

RUDOLPH A. KUEVER.
LARRY M. WHEELER.